US006640461B1

United States Patent
Berger

(10) Patent No.: US 6,640,461 B1
(45) Date of Patent: Nov. 4, 2003

(54) DRYER EXHAUST CONDUIT AND FLOW PASSAGE ELBOW WITH UNIVERSAL INTERCONNECTION THEREBETWEEN

(76) Inventor: Edwin L. Berger, 115 Albany Ave., Amityville, NY (US) 11701

( * ) Notice: Subject to any disclaimer, the term of this patent is extended or adjusted under 35 U.S.C. 154(b) by 60 days.

(21) Appl. No.: 10/144,310

(22) Filed: May 13, 2002

(51) Int. Cl.[7] ................................................ D06F 58/00
(52) U.S. Cl. ...................... 34/140; 34/235; 285/123.15; 285/374; 285/305
(58) Field of Search .............. 34/140, 235; 285/123.15, 285/374, 321, 305

(56) References Cited

U.S. PATENT DOCUMENTS

| | | | |
|---|---|---|---|
| 4,081,915 A | * 4/1978 | Materniak nee Babcerowicz et al. | ........ 34/235 |
| 5,042,172 A | * 8/1991 | Foco et al. | .................... 34/235 |
| 5,199,190 A | * 4/1993 | Mayer et al. | .................. 34/235 |
| 5,492,376 A | * 2/1996 | Usui et al. | .................... 285/382 |
| 5,568,947 A | * 10/1996 | Paquette | ....................... 285/46 |
| 5,819,435 A | * 10/1998 | Tuggle | ......................... 34/235 |
| 5,826,920 A | * 10/1998 | Bartholomew | .............. 285/305 |
| 5,934,712 A | * 8/1999 | Friedrich et al. | ....... 285/123.15 |
| 6,345,844 B1 | * 2/2002 | Miyajima et al. | ............. 285/39 |

* cited by examiner

*Primary Examiner*—Ira S. Lazarus
*Assistant Examiner*—Tu Cam Nguyen
(74) *Attorney, Agent, or Firm*—Myron Amer PC

(57) ABSTRACT

In the flow path to atmosphere venting hot exhaust gases of a clothes dryer, a fluid-tight seal between a flow-diverting elbow telescoped about a clothes dryer exiting conduit consisting of a rubber sleeve in increasing thicknesses in width in the direction of flow effective in providing an establish sealing contact into the sleeve at a location of its thickness which obviates leakage of gas through the telescoping connection.

1 Claim, 2 Drawing Sheets

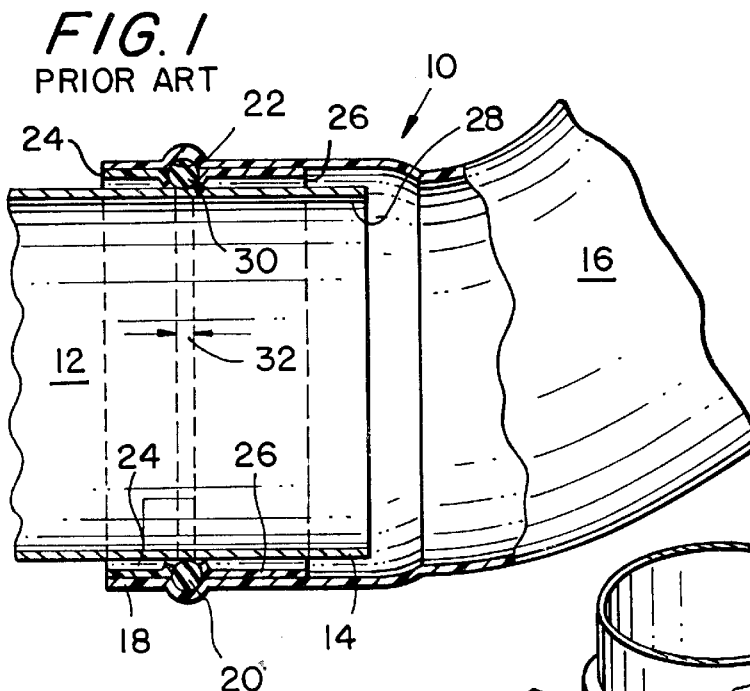
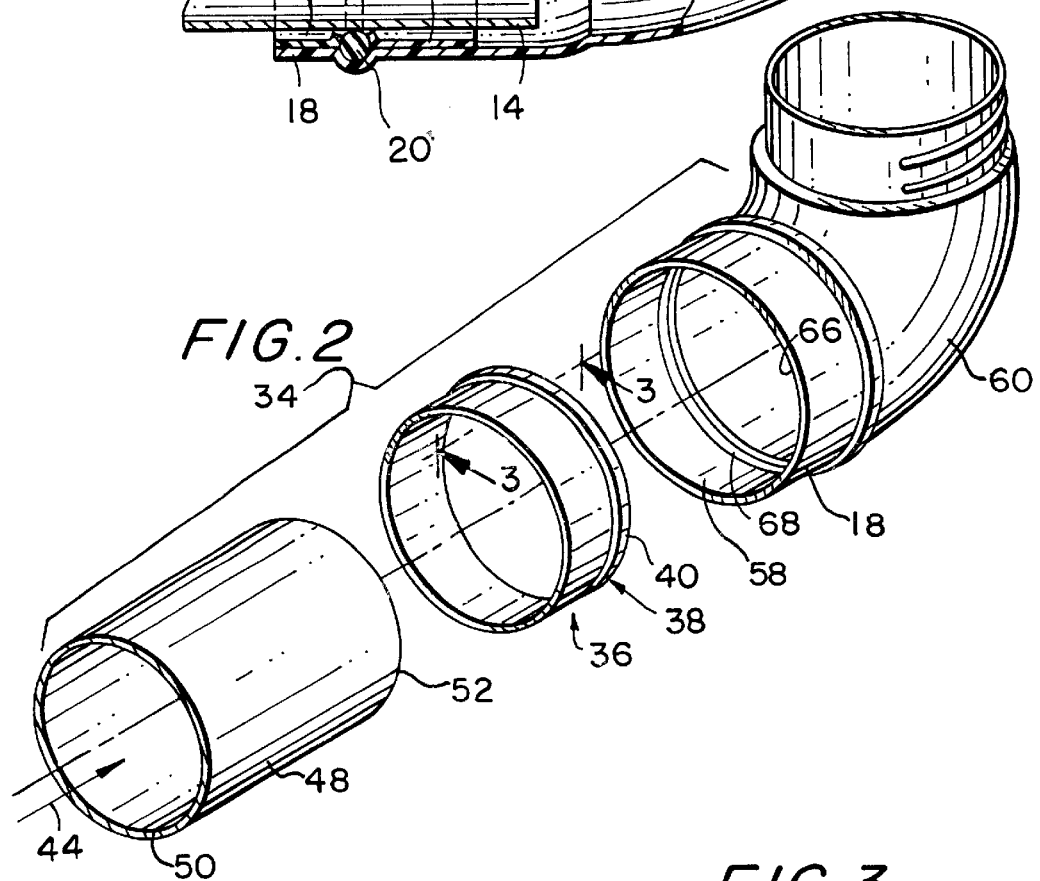
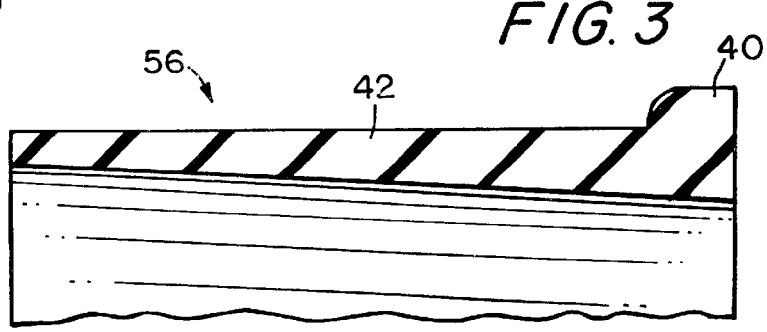

DRYER EXHAUST CONDUIT AND FLOW PASSAGE ELBOW WITH UNIVERSAL INTERCONNECTION THEREBETWEEN

The present invention relates generally to an improved venting system of hot exhaust gases from a clothes dryer to atmosphere, in which typically the flow path is usually not straight from the clothes dryer to the dwelling exhaust opening to atmosphere, and in which circumstance a flow component of choice to divert the flow path of exiting exhaust gas from the installation site of the clothes dryer to the site of the dwelling exit opening to atmosphere is a so-called elbow; the venting system improvement hereof being an effective fluid-tight seal at the interconnection of an outlet of a conduit from the clothes dryer to an inlet of the elbow.

EXAMPLE OF THE PRIOR ART

In a prior art venting system of the nature involved, using as an example that of U.S. Pat. No. 4,081,915 for "Exhaust System For Laundry Dryer" issued to Matemiak on Apr. 4, 1978, at an interconnection of an elbow telescoped about the outlet of a conduit from the clothes dryer, a fluid-tight seal is achieved using an O-ring. While generally effective for the purposes intended, the sealing efficacy of the O-ring is lessened if the manufacturing tolerance of the conduit results in a significantly undersized outside diameter in the conduit. Another drawback is the need to hold the O-ring against longitudinal movement, which is complicated by its spherical shape and thus its propensity to roll, during the telescoping of the two flow components together.

Broadly, it is an object to provide a fluid-tight seal for an exhaust gas venting system overcoming the foregoing and other shortcomings of the prior art.

More particularly, it is an object to increase to an extent the surface-to-surface contact of the fluid-tight seal so as to account for any diameter size variance in clothes dryer conduit, as well as to simplify maintaining the site of the seal against movement as might adversely effect the seal provided, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a partial longitudinal cross sectional view of a fluid seal of a prior art clothes dryer exhaust gas venting system;

FIG. 2 is an exploded perspective view of components, in unassembled condition, of a clothes dryer exhaust gas venting system and of a fluid seal thereof according to the present invention;

FIG. 3 is a partial cross sectional view, as taken along line 3—3 of FIG. 2, and in an enlarged scale, of a fluid-tight seal-rubber sleeve component of said components of FIG. 2;

Figure 4:
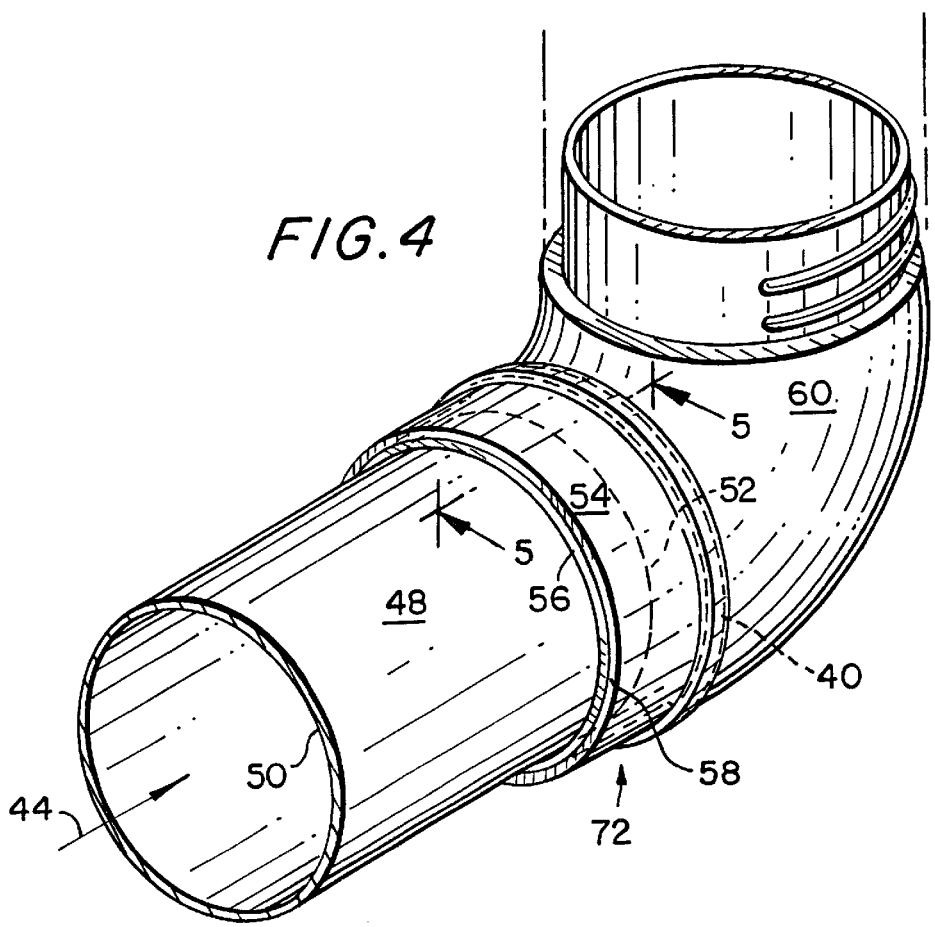
FIG. 4 is a perspective view similar to FIG. 2, but illustrating the components thereof in an assembled condition.

In a venting system of hot exhaust gases from a clothes dryer to atmosphere, the flow path is usually not straight from the clothes dryer to the dwelling exhaust opening to atmosphere and thus, and as best understood from FIG. 1, a prior art exhaust gas venting system, generally designated 10, includes a conduit 12 connected to extend rearwardly of a clothes dryer (not shown) having an end 14 connected to an elbow, generally designated 16, which is the flow component of choice to divert the flow path of exiting exhaust gas from the installation site of the clothes dryer to the site of the dwelling exit opening (not shown) to atmosphere. A fluid seal is provided in the connection of the conduit end 14 to the inlet end 18 of the elbow 16, and typically it consists of a an O-ring 20 seated in a recess 22 and held against longitudinal displacement movement from the recess 22 by a cooperating pair of fore and aft rubber rings 24 and 26, said rings preventing the displacement noted during the fitting of the elbow end 16 in encircling relation about the conduit outlet end 28. The prior art seal, as noted at 30, is a function of the extent of contact established between a maximum width 32 of the inwardly protruding spherical surface of the O-ring 20 and the outside diameter of the conduit end 28, and in practice does not always consist of the maximum width 32 but of a lesser width, as when the outside diameter of the conduit end 28 is at its smaller range of manufactured size tolerance for the conduit 12, Addressing the problem of providing a fluid-tight seal less affected by manufacturing tolerance of the diameter size of the outlet end of the clothes dryer exhaust conduit and the inlet end of the elbow flow component, the within inventive venting system, generally designated 34, eschews the use of a prior art O-ring 20 and instead uses to advantage, as best understood from FIG. 2, an open ended rubber sleeve 36 having at one end 38 a radial collar 40, and which in cross section, as illustrated in an enlarged scale in FIG. 3, a wedge shaped body 42 increasing in thickness in the direction of exhaust gas exiting flow 44 from, in a preferred embodiment approximately one-eighth inches to approximately three-sixteenths inches for a sleeve length of approximately one and one quarter inches.

The venting system 34 has an open ended rearwardly extending conduit 48 connected at one end 50 from a clothes dryer (not shown) and having at an opposite end 52 a first coupling 54 cooperating with a second coupling 56 of an inlet opening end 58 of a flow path diverting elbow 60, the respective noted couplings consisting, in the case of the first coupling 54 of a length portion 62 of conduit 48 adjacent the outlet opening 64 thereof, and in the case of the second coupling 56, of a length portion 66 adjacent the inlet opening 66 of the elbow 60 and a recess 68 positioned inwardly of the opening 66 and at a distance therefrom approximately the longitudinal size of the sleeve 36.

Figure 5:
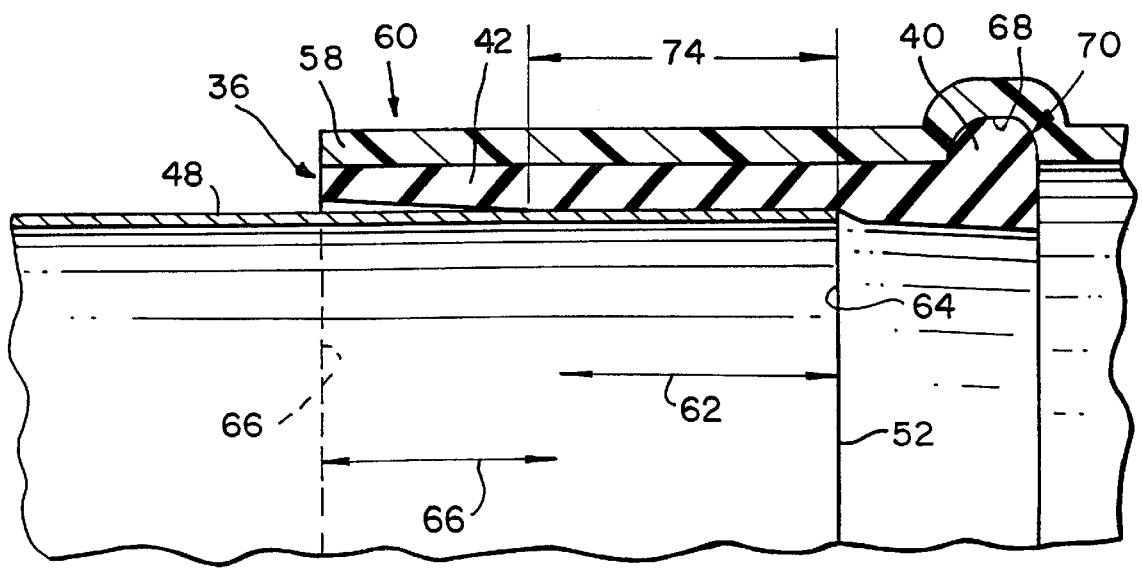
FIG. 5 is a partial cross sectional view, as taken along line 5—5 of FIG. 4, and in an enlarged scale, illustrating a fluid-tight seal of said rubber sleeve component.

Assembly of the components of FIG. 2 into their assembled condition of FIG. 3 contemplates as a first step maneuvering the sleeve 36 through the elbow opening 66 until there is alignment of the collar 40 with the recess 68, at which alignment the sleeve 36 is released resulting in the seating of the collar 40 in the recess 68, as noted at 70 in FIG. 5, a condition which in practice is effective to hold the sleeve 36 against longitudinal movement.

Next, the elbow end 58 is disposed in a telescoped interconnection, as noted at 72, over the conduit outlet end 52, an operative position of the first and second couplings 54, 56 in which the body 42 of the sleeve 36 is in an interposed position between the couplings 54, 56. During the telescoping thereof, and as best understood from FIG. 5, contact is theoretically able to be established between the conduit 48 and elbow 60 for a linear extent 74 which in practice exceeds that of the nominal size of an inwardly protruding spherical surface of an O-ring. Additionally, the rubber construction material of the sleeve 36 is radially compressible and thus the conduit end 52 of metal construction material establishes contact at progressively plural increases of thickness of the sleeve 36, to thereby provide an effective fluid-tight seal for the venting system 34.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A venting system for diverting exhaust gas from a clothes dryer to an outlet to atmosphere comprising an open ended rearwardly extending conduit connected at one end from a clothes dryer and having at an opposite end a first coupling along a flow path of exiting gas from said clothes dryer, an open ended elbow having a second coupling at one end connected to said conduit first coupling to divert existing exhaust gas therefrom, said first coupling disposed in a telescoped operative interconnection within said second coupling, and a fluid-tight seal at said interconnection consisting of a length portion of said first coupling bounding an exit opening in an inner operative position in said telescoped interconnection, a semicircular wall bounding a circular recess adjacent an end of said length portion of said second coupling bounding an inlet opening in an outer operative position in said telescoped interconnection, and a rubber sleeve having a wedge shape in cross section in increasing thickness in the direction of exhaust gas exiting flow and an end selectively sized radially extending semispherically shaped collar, said sleeve having an operative position interposed between said first and second couplings, said interposed operative position being said radially extending collar of a size selected to seat within said circular recess so as to constrain said sleeve against opposite directional longitudinal movement and to hold said first coupling length portion in an established contact against said second coupling length portion whereby during a telescoping of said first and second couplings said established contact occurs at a thickness of said sleeve which contributes to providing a fluid-tight seal and in opposite untelescoping movement said sleeve remains in place.

* * * * *